(12) United States Patent
Romagnoli et al.

(10) Patent No.: US 8,064,776 B2
(45) Date of Patent: Nov. 22, 2011

(54) DISPERSION TOLERANT OPTICAL SYSTEM AND METHOD

(75) Inventors: Marco Romagnoli, Milan (IT); Paola Galli, Milan (IT)

(73) Assignee: PGT Photonics, S.p.A, Milan (IT)

( * ) Notice: Subject to any disclaimer, the term of this patent is extended or adjusted under 35 U.S.C. 154(b) by 499 days.

(21) Appl. No.: 12/335,991

(22) Filed: Dec. 16, 2008

(65) Prior Publication Data

US 2010/0040382 A1  Feb. 18, 2010

(30) Foreign Application Priority Data

Aug. 13, 2008 (EP) .................................. 08162329

(51) Int. Cl.
*H04B 10/04* (2006.01)
(52) U.S. Cl. ........................ 398/187; 398/190; 398/199
(58) Field of Classification Search ........... 398/187–201
See application file for complete search history.

(56) References Cited

U.S. PATENT DOCUMENTS

| | | | |
|---|---|---|---|
| 4,561,119 A * | 12/1985 | Epworth | 398/195 |
| 6,721,081 B1 * | 4/2004 | Mauro et al. | 359/279 |
| 7,054,538 B2 | 5/2006 | Mahgerefteh et al. | |
| 2004/0008933 A1 | 1/2004 | Mahgerefteh | |
| 2005/0111852 A1 * | 5/2005 | Mahgerefteh et al. | 398/187 |
| 2006/0029397 A1 * | 2/2006 | Mahgerefteh et al. | 398/187 |
| 2008/0069569 A1 | 3/2008 | Nelson et al. | |
| 2008/0193143 A1 * | 8/2008 | Mahgerefteh et al. | 398/183 |

OTHER PUBLICATIONS

U. Fischer, "10 Gbits transmission over 69 km of non-dispersion-shifted singlemode fibre with CPFSK direct modulation of 1.55 mu m BH DFB laser" Electronics Letters vol. 28, Issue 14, Jul. 2, 1992, p. 1305-1306.

* cited by examiner

*Primary Examiner* — Dzung Tran

(57) ABSTRACT

An optical communication system and method of use are described. The system comprises an optical source adapted to receive a digitally encoded data signal comprising sequences of data at a data rate (B) and comprising two signal levels representing a first state and a second state of the data signal, the optical source being adapted to produce an optical signal substantially frequency modulated with frequency excursion $\Delta v$ comprising a first instantaneous frequency ($v_0$) associated to the first state and a second instantaneous frequency ($v_1$) associated to the second state; an optical converter adapted to receive the substantially frequency modulated optical signal, the optical converter having an optical transfer function varying with frequency and including at least one pass band, the at least one pass band having a peak transmittance and at least a low-transmittance region.

20 Claims, 13 Drawing Sheets

DISPERSION TOLERANT OPTICAL SYSTEM AND METHOD

CROSS-REFERENCE TO RELATED APPLICATIONS

The present application is related to and claims priority under 35 U.S.C. §119 from European Patent Application 08162329, Aug. 13, 2008 entitled "Dispersion Tolerant Optical System and Method Thereof." The entire disclosure of this patent application is specifically incorporated herein by reference.

BACKGROUND

Recently, there has been a growing interest in directly modulated lasers for use as transmitters in optical communication systems because they allow a compact design, have large response to modulation, and are integrable. In addition, they are typically inexpensive compared to externally-modulated transmitters, which require an intensity modulator, such as $LiNbO_3$ modulators, following the laser.

Various optical sources, such as semiconductor lasers, exhibit optical frequency chirp when directly modulated by a signal, due to the fact that intensity modulation in semiconductor lasers is invariably accompanied by phase modulation because of the carrier-induced change in the refractive index.

Fiber based transmission systems that use Directly Modulated Laser (DML) sources having optical frequency chirp suffer signal degradation due to optical dispersion in the transmission fiber. In a digital system, dispersion causes the digital pulses to spread in time. As a result, the pulses can overlap and interfere with each other, thereby limiting data transmission speed. Since pulse duration broadens linearly with traveled distance, system performance degrades because of Inter Symbol Interference (ISI). For instance, DML sources at 1550 nm wavelength and 10 Gb/s data rate typically generate an optical signal that propagates no more than 10 kilometers in standard fiber links, such as along standard single-mode fibers (SMFs).

In order to minimize the transient response of the DML occurring at bit transitions, conventional direct intensity modulation of a semiconductor laser is achieved by operating the laser with a bias current well above the lasing threshold and setting a modulation depth small enough to avoid switching off of the laser upon modulation, i.e., by operating in the so-called small or weak signal regime. In this condition, the "off" or "0" state has an optical power ($P_0$) that is a fraction of the power ($P_1$) at the "on" or "1" state. In addition the small modulation mitigates the inclusion in the signal of the transient and thermal chirp contributions arising from the sudden changes in injection current. However, this choice affects the value of Extinction Ratio (ER), defined as $ER=P_1/P_0$ and often also specified as a dB value, 10 log(ER), which is typically not larger than about 2 dB.

In an optical communication system, the receiver sensitivity, expressed in terms of received optical power, increases as the ER decreases. This is because any deviation from the ideal optical signal at the receiver, i.e. a bit stream made of bits '1' bits '0', leads to a change of the '0' and '1' bit levels, reducing the degree of discrimination between the two symbols and leading to ISI. To keep the Bit Error Rate (BER) at a predetermined value, the minimum average optical power required at the receiver increases because of such non-ideal conditions. This increase in the average received power is generally referred to as power penalty.

Larger optical link lengths can be achieved by employing frequency modulation of the laser with subsequent optical conversion into intensity modulation.

A frequency discriminator may be chosen to partially compensate for the dispersion in the transmission fiber while converting a Frequency Modulated (FM) signal from a laser into a substantially intensity-modulated signal, generally referred to as Amplitude Modulated (AM) signal.

What is needed, therefore is an optical system and method that overcome at least the shortcomings described above.

SUMMARY

In accordance with a representative embodiment, an optical communication system for transmitting digital optical signals comprises: an optical source adapted to receive a digitally encoded data signal comprising sequences of data at a data rate (B) and comprising two signal levels representing a first state and a second state of the data signal, the optical source being adapted to produce an optical signal substantially frequency modulated with frequency excursion $\Delta v$ comprising a first instantaneous frequency ($v_0$) associated to the first state and a second instantaneous frequency ($v_1$) associated to the second state. The optical system also comprises an optical converter adapted to receive the substantially frequency modulated optical signal, the optical converter having an optical transfer function varying with frequency and including at least one pass band, the at least one pass band having a peak transmittance and at least a low-transmittance region. The first instantaneous frequency ($v_0$) of the frequency modulated optical signal is spectrally aligned within the low-transmittance region of the optical transfer function of the optical converter thereby converting the substantially frequency modulated signal into a substantially amplitude modulated signal and the at least one pass band has a FWHM comprised between 70% and 200% of the data rate (B) of the frequency modulated optical signal.

In accordance with another representative embodiment, an optical communication system for transmitting digital optical signals comprises: a data generator adapted to generate a digitally encoded data signal comprising sequences of data at a data rate (B) and comprising two signal levels representing a first state and a second state of the data signal; an optical source adapted to receive the data signal and to produce an optical signal substantially frequency modulated with frequency excursion $\Delta v$ comprising a first instantaneous frequency ($v_0$) associated to the first state and a second instantaneous frequency ($v_1$) associated to the second state; an electrical signal path adapted to receive the data signal generated by the data generator and to input the data signal into the optical source, the electrical signal path having a low-pass transfer function with a cut-off frequency $f_c$; and an optical converter adapted to receive the substantially frequency modulated optical signal, the optical converter having an optical transfer function varying with frequency and including at least one pass band, the at least one pass band having a peak transmittance and at least a low-transmittance region, wherein the first instantaneous frequency ($v_0$) of the frequency modulated optical signal is spectrally aligned within the low-transmittance region of the optical transfer function of the optical converter thereby converting the substantially frequency modulated signal into a substantially amplitude modulated signal and the cut-off frequency $f_c$ of the electrical signal path is not larger than about 2.2 times the frequency excursion $\Delta v$.

DEFINED TERMINOLOGY

As used herein, the terms 'a' or 'an', as used herein are defined as one or more than one.

In addition to their ordinary meanings, the terms 'substantial' or 'substantially' mean to with acceptable limits or degree to one having ordinary skill in the art. For example, 'substantially cancelled' means that one skilled in the art would consider the cancellation to be acceptable.

In addition to their ordinary meanings, the terms 'approximately' mean to within an acceptable limit or amount to one having ordinary skill in the art. For example, 'approximately the same' means that one of ordinary skill in the art would consider the items being compared to be the same.

DETAILED DESCRIPTION

In the following detailed description, for purposes of explanation and not limitation, representative embodiments disclosing specific details are set forth in order to provide a thorough understanding of the present teachings. Descriptions of known devices, materials and manufacturing methods may be omitted so as to avoid obscuring the description of the representative embodiments. Nonetheless, such devices, materials and methods that are within the purview of one of ordinary skill in the art may be used in accordance with the representative embodiments.

Figure 1:
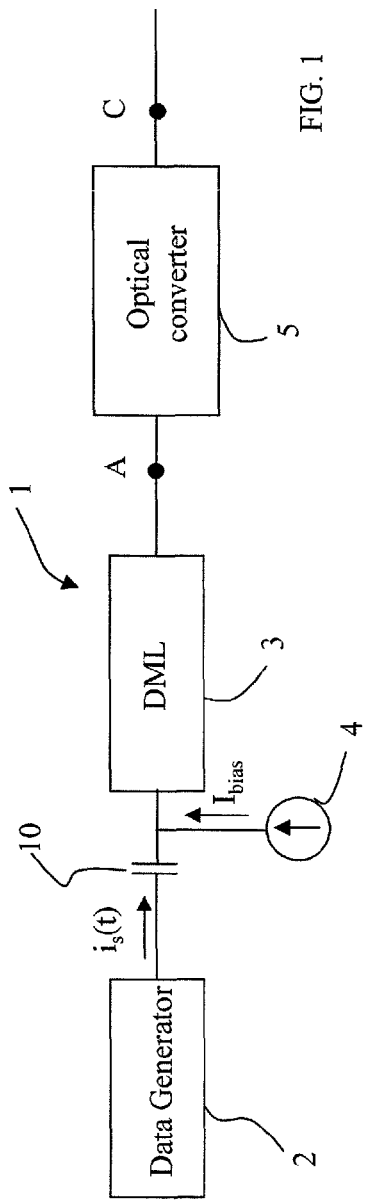
FIG. 1 is a schematic diagram of an optical transmitter comprising a directly modulated laser and an optical converter in accordance with a representative embodiment.

FIG. 1 illustrates a schematic structure of an optical transmitter in which a substantially FM signal produced by a directly modulated laser source is converted into a substantially AM signal by an optical converter. In particular, a transmitter 1 comprises a data generator 2 adapted to generate a digitally encoded electrical modulated signal, $i_s(t)$, referred also to as the data signal. In the preferred embodiments, the digitally encoded data signal is a binary-coded signal representing the digital data pattern consisting of 1's and 0's, at a bit rate, B, e.g., 10 Gb/s. In the preferred embodiments, the modulation format of the data pattern is a Non-Return-to-Zero (NRZ) modulation format, which can be supplemented by Forward Error Correction (FEC) redundant data by a FEC processor (not shown), according to known practice.

The data signal modulating current is added to the bias current, $I_{bias}$, (provided by a current bias supply 4) of a Directly Modulated Laser (DML) 3, such as a Distributed Feedback (DFB) semiconductor laser diode.

Optionally, the transmitter 1 includes a so-called bias-T device 10, of known type, arranged along the electrical path connecting the data generator 2 with the DML 3, which is used to superimpose the modulation current $i_s(t)$ to the DC bias current $I_{bias}$.

Figure 2:
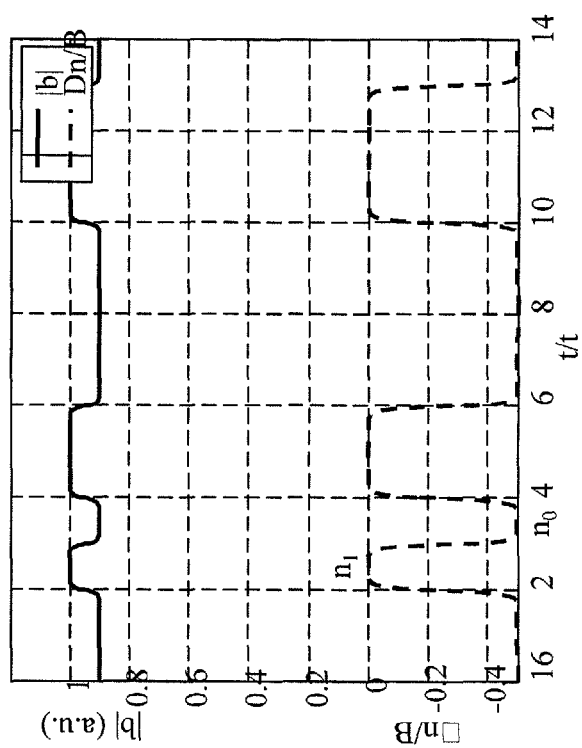
FIG. 2 is a chart illustrating the temporal profile of the field modulus (top) and of the optical frequency (bottom) of a directly modulated laser (DML) before passing through the optical converter in accordance with a representative embodiment.

FIG. 2 is a schematic diagram illustrating the amplitude profile (field modulus, |b|, solid line) and frequency profile (dashed line) plotted along the same time axis at the output of the DML 3 (e.g., at point A of the transmitter of FIG. 1) biased well above threshold, and modulated with a small current modulation. For example, the DML can be a commercial DFB laser, for instance a 295G edge-emitting DFB laser diode chip produced by Cyoptics, Inc. In the example of FIG. 2, the bias current is 80 mA and the modulation current is ±15 mA. In the time axis, the time is normalised to the bit period, $\tau=1/B$, e.g., $\tau=100$ ps for B=10 Gb/s.

The instantaneous frequency of the laser output changes (on average) between two extremes, $v_0$, the optical frequency of the "0" state, and $v_1$, the optical frequency of the "1" state and their frequency excursion, $\Delta v=v_1-v_0$, is often referred to as the adiabatic chirp of the laser. The frequency excursion is plotted in FIG. 2 normalised to the bit rate of a NRZ binary-coded data signal used to directly modulate the injection current of the laser.

Always with reference to FIG. 2, the amplitude modulated component makes up only a small portion of the output signal. The modulation of the amplitude typically ranges from about 5 to 20% of the average amplitude of the output signal. Thus, the ER of the laser output signal is generally poor because the amplitude component of the modulation does not allow a good discrimination of the '1's and '0's bits.

Figure 3:
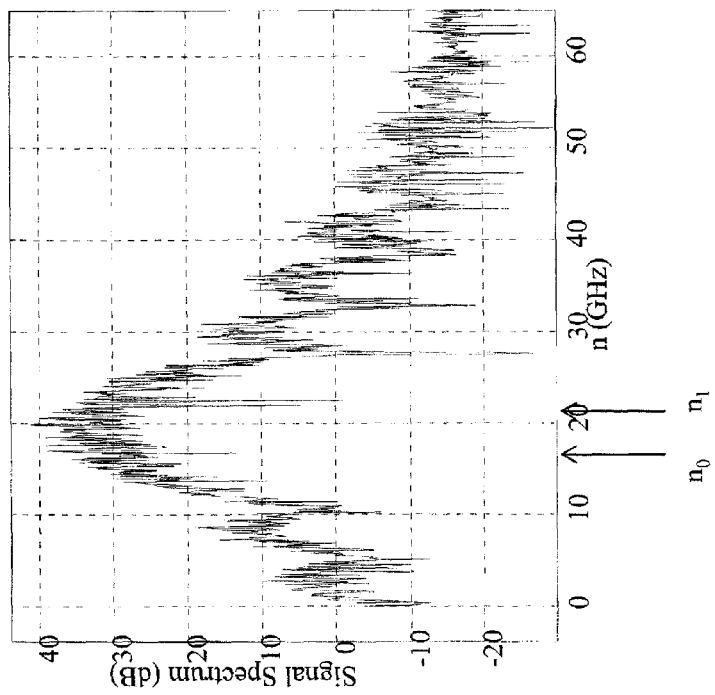
FIG. 3 illustrates an exemplary spectral distribution of a semiconductor directly modulated laser at 10 Gb/s of bit rate modulation in accordance with a representative embodiment.

FIG. 3 reports an example of the spectrum of the output signal of a directly modulated semiconductor DFB laser with bit rate of 11.1 Gb/s and □□=5.6 GHz. Positions of the optical frequencies $v_0$ and $v_1$ in the abscissa of the spectrum are indicated. In the shown example, the bandwidth at −20 dB of the output signal is of about 15 GHz.

With reference back to FIG. 1, the modulated optical signal emitted by the DML 3 passes through an optical converter 5 which has an optical transfer function that is spectrally aligned with the laser signal in such a way (more detailed below) that the substantially FM signal is converted into a substantially AM signal. In a preferred embodiment, the optical converter is a Mach-Zehnder (MZ) interferometer-type optical filter. The MZ optical filter can be realized, in a per se known manner, for example, in free space, bulk micro-optics, multilayer optics, with optical fibers or as a passive waveguide circuit, with the latter being optionally integrated with the laser.

In some embodiments, DML 3 may be an external cavity directly modulated laser, of known type, comprising a directly modulated gain chip, which includes a partially reflective surface defining a first end of the external cavity, and an end mirror defining a second end of the external cavity. The external cavity provides a round-trip path for light travel.

In some embodiments, the DML is tunable in wavelength, i.e., the output laser signal has a central emission wavelength that can be tuned within a given wavelength range, e.g., within the C-band for WDM applications.

Applicant has observed that, in order to improve the ER of the digital optical signal to be transmitted, the laser output frequency spectrum should be spectrally aligned with a high attenuation (low transmission) of the optical transfer function of the optical converter.

Figure 4:
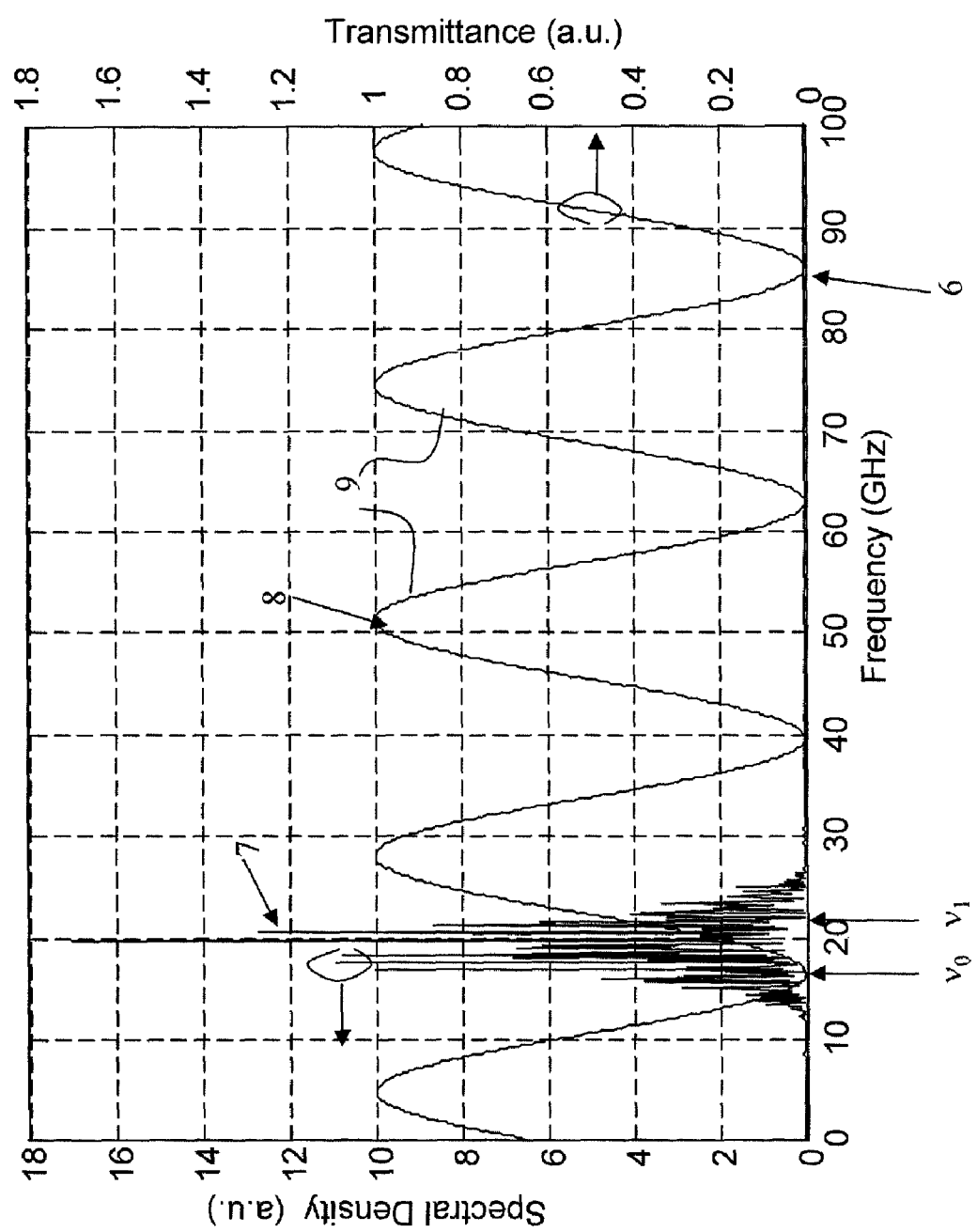
FIG. 4 illustrates the spectral overlap between the optical transfer function of a single-stage MZ filter and the modulated frequency signal of the laser vs. optical frequency, in accordance with a representative embodiments.

FIG. 4 illustrates the optical transfer function, on a linear scale (right axis), of a single-stage MZ interferometer-type optical filter vs. frequency and the spectral density 7 (left axis) of a DFB semiconductor laser modulated in frequency with frequency excursion $\Delta v=v_1-v_0$. In order to improve clarity of the figure, the laser output spectrum is not to scale with the optical transfer function of the optical converter. The single stage MZ filter of the embodiment has a substantially sinusoidal periodic transfer function that includes a series of pass bands 9, each having transmittance peak 8 and low-transmittance regions comprising notches 6, where the transmittance has a local minimum. Preferably, the notch transmittance has a value several orders of magnitude smaller (e.g., from 10 to 40 dB) than the peak transmittance of the pass bands. At frequencies within the pass bands, and especially in the proximity of the transmittance peak, a substantial portion of the light supplied through the filter is present at the output of the same; at frequencies corresponding to the notches 6, little or none of the light supplied to the filter reaches its output. The optical transfer function is periodic, i.e., the peaks and notches recur at substantially regular intervals along the frequency axis. The frequency (or wavelength) range between transmission maximum values (peaks) is usually referred to as Free Spectral Range (FSR). In the example reported on in FIG. 4, the MZ filter has an FSR of 25 GHz.

The transmission function of the MZ filter is spectrally aligned with respect to the output frequency spectrum of the laser so that at least the optical frequency $v_0$ is located in the low-transmittance region of the optical filter.

Preferably, the optical frequency $v_0$ is substantially aligned with a frequency position of local transmittance minimum, i.e., a notch, of the optical filter. In particular, for a periodic transfer function with a given FSR, a substantial alignment of the optical frequency $v_0$ of the laser signal with the filter notch indicates that overlaps the notch frequency within a frequency range of about FSR/8, preferably within a frequency range of FSR/10.

Figure 5:
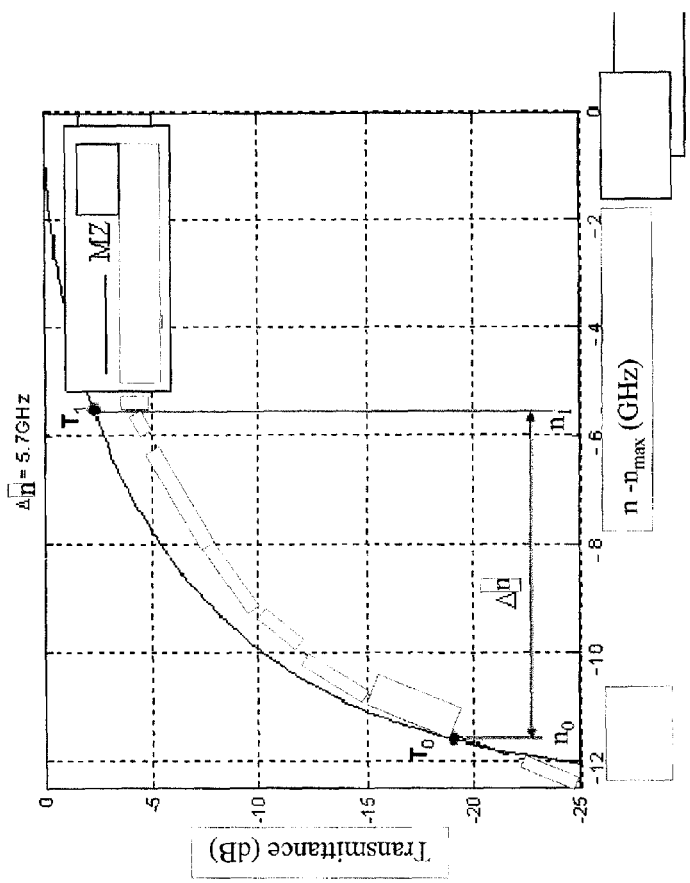
FIG. 5 illustrates an enlargement of the operating region of the transfer function of the MZ filter of FIG. 4 (no laser spectrum is shown) as a function of the frequency offset, $(v-v_{max})$, from the optical frequency, $v_{max}$, corresponding to the nearest peak transmittance.

In general, the working region in the frequency domain of the transmitter, which comprises the operating point of the transmitter, overlaps at least partially the low-transmittance region (preferably comprising the notch) of the optical converter. FIG. 5 illustrates an enlargement of the operating region of the optical transfer function, on a logarithmic scale, of a MZ filter (no signal spectrum is shown) as a function of the frequency offset or "detuning", $(v-v_{max})$, which is defined as the difference in frequency position with respect to the frequency position corresponding to the condition of spectral alignment between the laser signal and the optical filter transmission achieving the maximum transmitted power and corresponding to the frequency $v_{max}$. Usually, a zero detuning corresponds to the alignment of the laser signal with the transmission peak of the optical filter ($v=v_{max}$), which is shown in FIG. 5 normalized to 0 dB.

Filter transmittance at $v_0$ is indicated with $T_0$ and filter transmittance at $v_1$ is indicated with $T_1$. In the example shown in the figure, the frequency excursion, $\Delta v$, is 5.7 GHz and B=11.1 Gb/s. The ratio $T_1/T_0$ provides the extinction ratio, $ER_{OC}$, introduced by the optical converter, which adds up to the extinction ratio at the output of the laser, $ER_L$, upstream the optical converter (e.g., solid line of FIG. 2). Downstream the optical converter (e.g., at C in FIG. 1), extinction ratio, ER, is thus given by $ER_{OC}+ER_L$.

The Applicant has observed that, according to some preferred embodiments, the frequency $v_0$ of the '0' bit signal is positioned in a low-transmittance region of the filter transfer function in which the transmittance is at least 10 dB less than the maximum filter transmittance (corresponding to the peaks), i.e., $T_0 \leq -10$ dB, when the peak transmittance is normalised to zero. Preferably, $T_0 \leq -15$ dB, i.e., the low-transmittance region has a transmittance at least 15 dB less than the maximum filter transmittance.

Preferably, in order to obtain a substantially amplitude modulated optical signal with ER of at least 5 dB, $ER_{OC}$ is selected according to the relation $ER_{OC} \geq 5$ dB$-ER_L$. More preferably, in order to obtain a substantially amplitude modulated signal with ER of at least 10 dB, $ER_{OC}$ is selected according to the relation $ER_{OC} \geq 10$ dB$-ER_L$. The contribution of the extinction ratio of the laser, $ER_L$, is typically of 1÷2 dB for semiconductor DFB lasers generally used in telecom applications and, therefore, the total ER arises mainly from the contribution from the optical converter.

In the example shown in FIG. 5, the FSR is 25 GHz and thus the filter notch is positioned at $-12.5$ GHz with respect to the transmittance peak frequency. In order to obtain a laser intensity profile with an extinction ratio ER of the laser output downstream the optical converter of at least 10 dB, a centering of $v_0$ on the notch frequency in the frequency range $(v-v_{max})=-12.5$ GHz$\pm 2.5$ GHz would be advantageously selected.

Preferably, the optical frequency of the '1's bits, $v_1$, of the laser frequency spectrum, which approximately corresponds to the transmitter operating point when the optical converter is used with a frequency modulated NRZ signal, is located on the edge of the filter transmission pass band, preferably on the edge corresponding to a positive slope (i.e., a positive value of the derivative of the logarithmic transmission of the filter expressed in dB/GHz). Preferably, the filter transmission $T_1$ is between 1 and 4 dB smaller than the peak transmittance.

Figure 6:
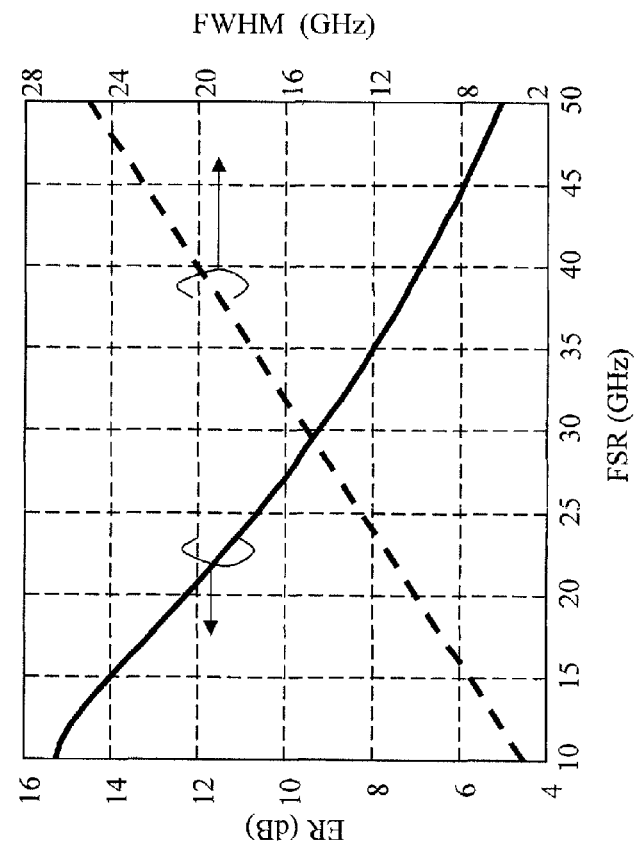
FIG. 6 is a chart illustrating the temporal profile of the field modulus at the DML output (dashed line) and after the optical converter (solid line) in accordance with a representative embodiment.

The above-described selection of the position of the laser output with respect to the optical converter transfer function causes a dramatic enhancement of the discrimination between the two amplitude levels and consequently a considerable increase of the ER of the binary-coded, and generally of the digitally encoded, modulated optical signal to be transmitted. FIG. 6 shows computer simulations of the amplitude profiles before (at point A of the transmitter of FIG. 1) and after the optical conversion through a MZ filter (output at point C of the transmitter of FIG. 1) aligned in the low transmittance region. It can be seen that the value of extinction ratio changes from less than 1 dB before the filter (FIG. 6, dashed line) to more than 15 dB after passing it (FIG. 6, solid line). The ER has significantly increased through the FM to AM conversion operated by the MZ filter in relative spectral alignment with the laser output spectrum as described above.

In practice, one way to spectrally align the optical converter with the laser modulated signal entails the step of maximizing the optical ER measured at the output of the optical converter (point C in FIG. 1).

Although a preferred embodiment of the transmitter includes a single-stage MZ filter as optical converter, it is understood that other embodiments may encompass an optical converter including multiple-stage MZ filter by arranging single-stage MZ devices in series, or by making a device with more than two optical path lengths. Alternatively, other optical filters having a transfer function with a low-transmittance region and a high-transmittance region (generally proximal or including a peak transmittance), which enables efficient discrimination between the '1' bits from the '0' bits, can be used as optical converter, such as single-cavity or multiple-cavity Fabry-Pérot filters or ring resonators.

The Applicant has become aware that improvement of optical system performances may require a suitable selection of the bandwidth of the optical converter.

Figure 7:
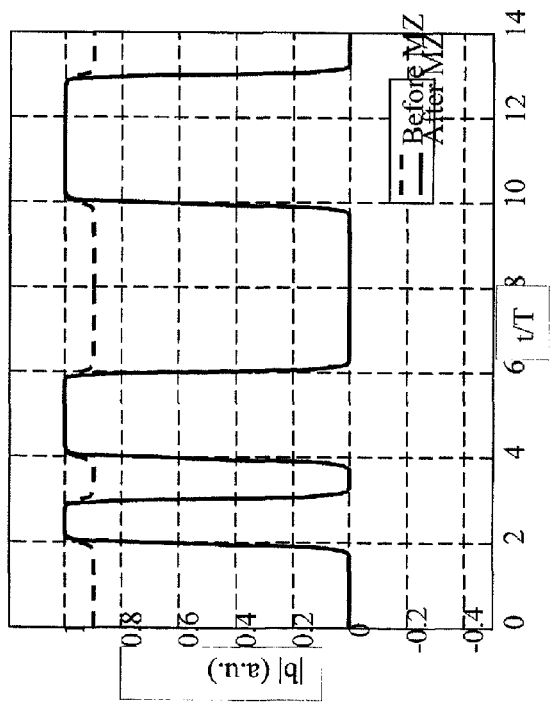
FIG. 7 reports on results from computer simulation of the extinction ratio (left scale) of an output optical signal at a transmitter and the calculated values of FWHM (right scale) as a function of the FSR of a MZ filter in accordance with a representative embodiment.

FIG. 7 reports results from computer simulation of the extinction ratio (ER, left scale, solid line) of a transmitter such that schematically shown in FIG. 1 as a function of the FSR of a single stage MZ filter for a signal bit rate of B=10 Gb/s. The laser output spectrum is assumed to be positioned in a low transmittance region of the transmission spectrum of the MZ filter, as described above. The value of the ER decreases monotonically with increasing FSR, being maximum for FSR=B. The FSR of a Mach-Zehnder interferometer is related to the bandwidth of the transmission peaks taken as Full-Width at Half Maximum (FWHM). For instance, a MZ filter with two 3 dB power splitters has a sinusoidal transmission transfer function and thus the FWHM is given by FSR/2. The dashed line (right scale) of FIG. 7 reports the calculated values of FWHM of the MZ filter corresponding to the FSR given in abscissa.

Applicant has observed that, when FSR=B, the FWHM of the optical converter is smaller than the bandwidth of the optical signal emitted from the DMLs commonly used in telecom applications, at least for transmission bit rates comprised between about 2 and 40 Gb/s. Generally speaking, the bandwidth of a DML scales with the bit rate of the data signal, increasing with increasing bit rate. In this condition, the transmission performance can be strongly reduced due to signal distortion before the propagation in the fibre link, i.e., in back-to-back, thereby reducing the reach of the transmission of the signal through the fibre link.

Figure 8:
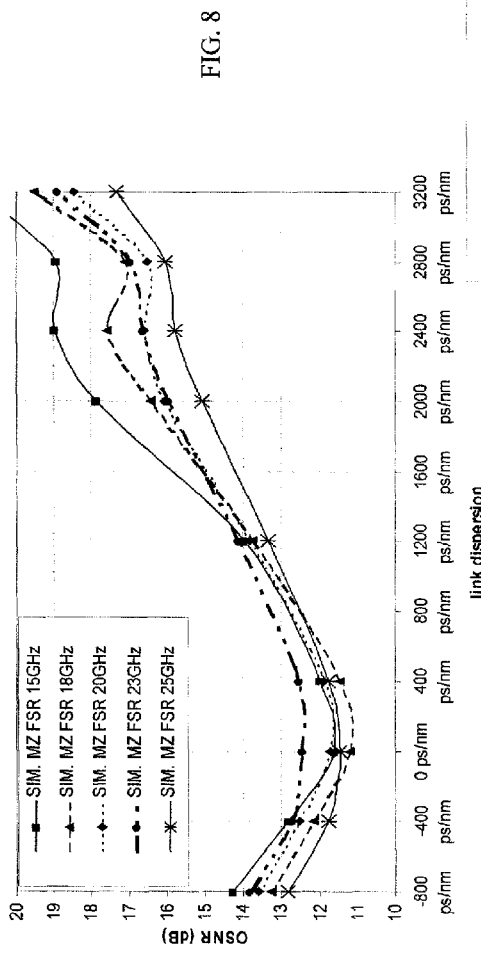
FIG. 8 illustrates the propagation performance expressed in Optical Signal-to-Noise Ratio (OSNR) vs. dispersion load, in ps/nm, for different values of FSR of the optical converter at the transmitter in accordance with a representative embodiment.

FIG. 8 illustrates the propagation performance expressed in Optical Signal-to-Noise Ratio (OSNR) vs dispersion load, in ps/nm, for different values of FSR (and thus FWHM) of a MZ filter at the transmitter. The OSNR is evaluated for a transmission at 11.1 Gb/s and Bit Error Rate (BER) of $10^{-4}$ measured on a 0.1 nm receiver bandwidth. For a given value of OSNR, the propagation distance increases with increasing FSR of the MZ, and thus with increasing FWHM.

Figure 9:
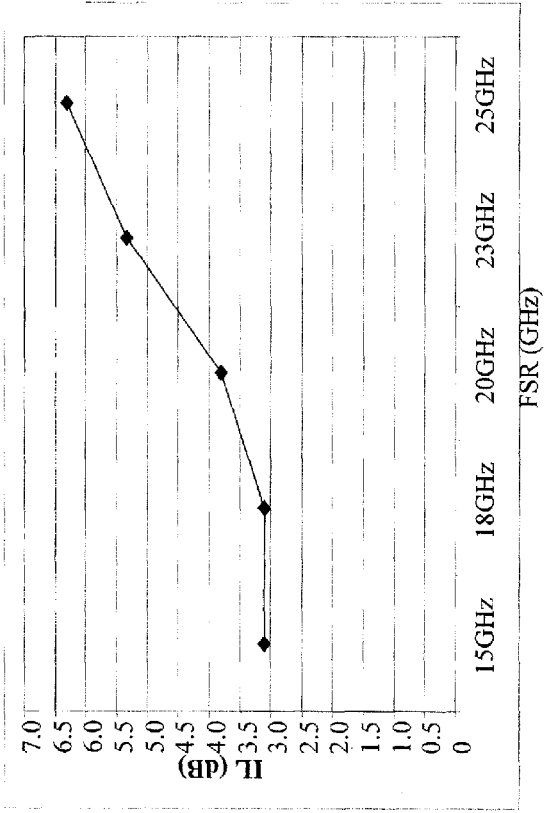
FIG. 9 shows results from computer simulations for the optical signal insertion loss vs. FSR of the optical converter for the same optical transmitter considered in the simulations of FIG. 8.

FIG. 9 shows results from computer simulations for the optical signal insertion loss vs. FSR (and thus FWHM) of a MZ filter for the same optical transmitter considered in the simulations of FIG. 8. Insertion loss is seen to increase with increasing FSR, for FSR values above 18 GHz.

The Applicant has observed that the filter's bandwidth can be advantageously selected as a trade-off between a maximization of the propagation distance and a minimization of insertion loss that affects the power budget of the optical link. It has been found that advantageously the FWHM of the optical converter is selected to be larger than half of the data rate of the modulated optical signal generated from the DML source.

According to some preferred embodiments, the FWHM of the optical converter is comprised between 70% and 200% of the data rate, more preferably between about 100% and 150% of the data rate.

In some embodiments, for signal bit rates comprised between about 9 and 12 Gb/s, the FWHM of the optical converter is preferably between 7 and 15 GHz, more preferably between 10 and 13 GHz.

According to an embodiment, the frequency excursion of the modulated signal is selected to be about half of the data rate. In this way, the phase shift between two '1's separated by an odd number of '0's is π, thereby providing that the tails in the leading and trailing edges of pulses corresponding to '1's interfere destructively in the time slot corresponding to the '0's.

In other words, the frequency excursion, $\Delta\nu$, is selected to satisfy the relation $$2\pi \cdot \Delta\nu \cdot \tau = \pi. \quad (1)$$

where $\tau$ is the bit period, $\tau = 1/B$. Applicant has observed that, in order to achieve signal transmission that benefit from the out-of-phase condition, the right term of Eq. (1) can be comprised between about $0.7\tau$ and $1.2\tau$. The value of the frequency excursion $\Delta\nu$ is preferably selected to be between 0.3 and 0.6 the bit rate, B.

The out-of-phase condition can be advantageous since it allows reduction of Inter Symbol Interference (ISI) upon propagation through the fibre link. The optical field cancellation in the time slot corresponding to the '0's contributes therefore to maintain high the value of both eye opening and ER of the received optical signal.

Laser chirp is in general made up of an adiabatic component and a transient component. As described above, adiabatic chirp defines the frequency excursion, $\Delta\nu$, between the average instantaneous frequency associated with the '1' symbol ($\nu_1$), and the average instantaneous frequency associated with the '0' symbol ($\nu_0$). The chart reported in FIG. 2 shows an "ideal" laser chirp exhibiting essentially only the adiabatic component. However, although a suitable choice of the bias current and of modulation depth can lead to an adiabatically-dominated chirp, transients arising from the intensity modulation of the power imply carrier injection transients, which lead to a mostly unavoidable transient index modulation. Transient component of the chirp is displayed in the laser output as an undershoot/overshoot at the transitions between the high/low and/or low/high frequency and power levels.

Applicant has become aware that, when an optical signal emitted by a DML and characterized by a chirp with a non-negligible transient component passes through an optical converter that is optically aligned to the laser signal with a low-transmittance region of the optical transfer function, which is typically highly non linear, transient components of the laser pulses are enhanced.

While not wishing to be bound by theory, the Applicant believes that the combination of a direct current modulation and the transfer function in the low transmittance region of the optical converter causes a spectral unbalancement that favors the high frequency components of the optical signal. The effect of the spectral unbalancement is a degradation of the eye diagram.

Figure 10:
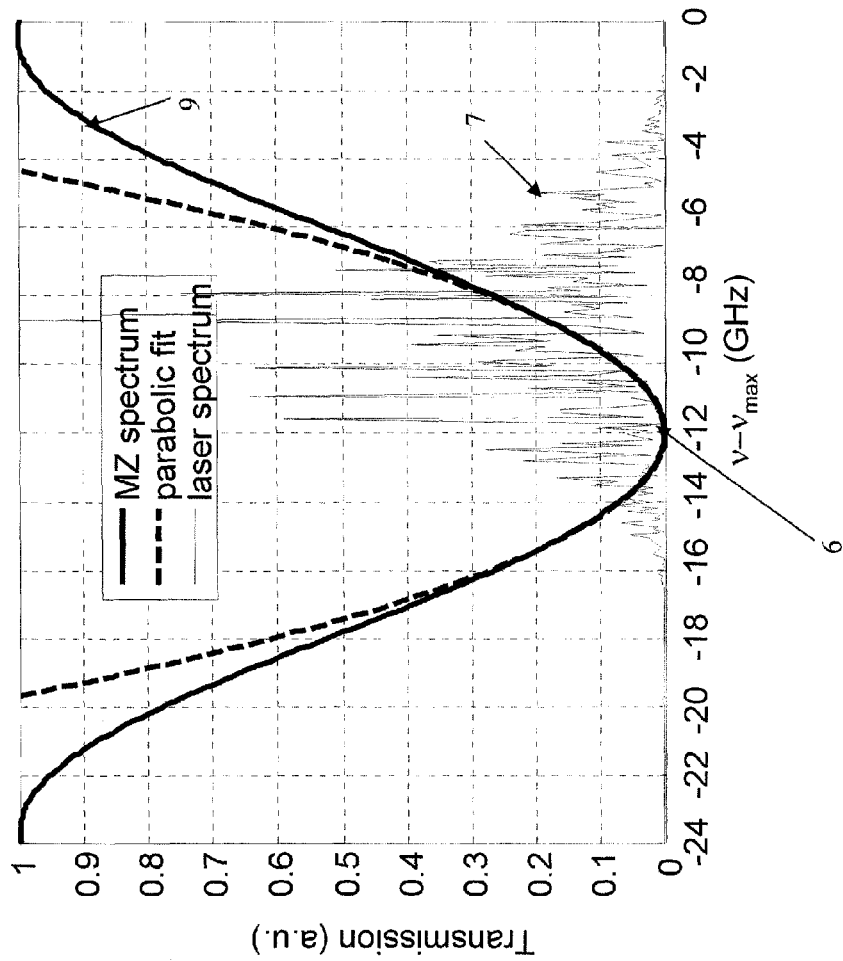
FIG. 10 is an enlargement of FIG. 4 in the frequency region of the spectral alignment between the laser output and the MZ filter transfer function, shown as a function of $(v-v_{max})$.

FIG. 10 shows an enlargement of FIG. 4 in the frequency region of the spectral alignment between the laser output and the filter transmission function (optical signals not to scale). In FIG. 10 the abscissa indicates the frequency "detuning", ($\nu - \nu_{max}$), which is defined as above.

The transmission spectrum $T(\nu)$ of an optical filter around an operating point $\nu_{op}$ can be expanded in Taylor's series:

$$T(\nu) = a + b(\nu - \nu_{op}) + c(\nu - \nu_{op})^2 + \quad (2)$$

where a, b and c are numerical (real) coefficients.

Each term of Eq. (2) may have a different impact on the input optical signal to be filtered and thus imparts different spectral shaping properties to the input signal.

As shown in FIG. 10, the optical transfer function of a single stage MZ filter (thick solid line) around the filter notch can be well approximated with a parabolic mathematical function (dashed line) having a vertex which corresponds in the figure to the frequency position of $(\nu - \nu_{max}) = \nu_c$ of the filter notch 6. With an alignment of the frequency laser signal (thin solid line) in the filter high-attenuation region, i.e., around the notch 6 positioned at a frequency offset $\nu_c$, a substantial portion of the band of the laser signal is filtered with a parabolic transfer function, where the transmission spectrum can be approximated with $$T(\nu) = c(\nu - \nu_c)^2. \quad (3)$$

In the example of FIG. 10, the laser signal bandwidth is of 15 GHz at −20 dB and more than 80% of the signal power lies in the parabolic spectral region of a MZ filter having FSR=24 GHz.

Applicant has realized that spectral discrimination introduced by an optical converter having a transmittance notch substantially in correspondence with the instantaneous frequency of the '0' bits, $\nu_0$, introduces a "differential effect" to the laser signal.

From Fourier theory, the time domain response $\tilde{T}(t)$ of a filter, whose transfer function is given by relation (3), is:

$$\tilde{T}(t) = -c\frac{d^2}{dt^2} \quad (4)$$

and thus the output field $E_{out}(t)$ is:

$$E_{out}(t) = -c\frac{d^2 E_{in}(t)}{dt^2} \quad (5)$$

where $E_{in}(t)$ is the input optical field. A parabolic optical transfer function then outputs the second time derivative of the input field.

Figure 11:
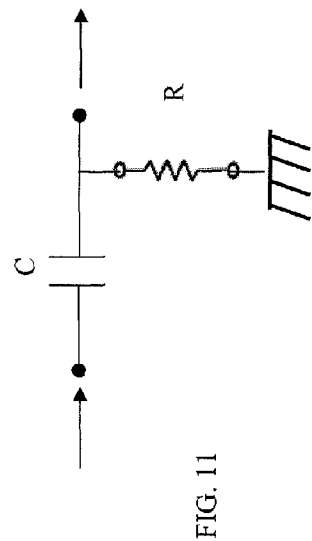
FIG. 11 illustrates the equivalent electrical circuit of the optical converter filtering the laser signal in the low-transmission region in accordance with a representative embodiment.

Generally speaking, a pass-band optical filter is significantly non linear in the low transmittance region, e.g., it has, as in the described case, a parabolic transfer function. In the equivalent circuit theory, the optical filter used in the notch region can be thought as an equivalent electrical high-pass filter, as schematically represented in FIG. 11, which discriminates against low frequencies and with cut-off frequency equal to the optical frequency excursion.

Applicant has recognized that the differential effect to the laser signal enhances the transient contribution of the power signal, thereby introducing signal distortions that may set a limit in the maximum span length of the optical link, even when a satisfactorily high ER at the transmitter is obtained due to the optical FM-AM conversion of the laser signal.

Furthermore, the Applicant has noted that for data signals at bit rates larger than frequency excursion, such as in the case of Minimum Shift Keying (MSK) modulation format where $\Delta\nu \sim B/2$, a significant fraction of the information content carried by the data signal is in a frequency range outside the value of the frequency adiabatic chirp, $\Delta\nu$. Frequencies in excess of the adiabatic chirp may significantly contribute to pulse spreading with increasing propagation distance of the fiber link and thus may lead to ISI with consequent optical eye degradation. More generally, the dispersion penalty increases because the amount of the spreading of the pulses in time, induced by the dispersive fiber, is proportional to the overall range of frequencies, or signal bandwidth.

Applicant has found that the differential effect introduced by the optical converter, which enhances the transients originating from DML laser, and the transients selves can be at least partially compensated for by electrically filtering the digitally encoded electrical data signal generated by the data generator, $i_s(t)$, with a low-pass transfer function with cut-off frequency, $f_c$, not larger than about 2.2 times the optical frequency excursion, $\Delta\nu$. Within the present context, the cut-off frequency is taken as the frequency corresponding to the 3 dB of attenuation of the maximum transmittance of the filter transfer function.

Preferably, the cut-off frequency is at least equal to about the frequency excursion to avoid degradation of the frequency discrimination between bits '1' and '0' that are separated by the $\Delta v$ value. Applicant has noted that, in some embodiments, the value of the cut-off frequency can be also selected to be slightly smaller than $\Delta v$, for instance down to 80% of the $\Delta v$ value.

According to some preferred embodiments, the optical transmitter comprises an electrical signal path that electrically connects the data generator with the laser source, the electrical signal path having a low-pass transfer function with cut-off frequency, $f_c$, not larger than $2.2(\Delta v)$. In one set of embodiments, the cut-off frequency, $f_c$, is not larger than about $2(\Delta v)$.

According to some preferred embodiments, the value of the frequency chirp $\Delta v$ is selected to be between 0.3 and 0.6 times the data rate, B. In some embodiments, the value of $\Delta v$ is comprised between 0.3 and 0.45 times the data bit rate, e.g., $\Delta v=4$ GHz for B=11.1 Gb/s. Applicant has noticed that, for $\Delta v$ comprised between 0.3 B and 0.45 B, the cut-off frequency of the low pass transfer function can be selected to be not larger than about $2.2(\Delta v)$ and preferably not larger than $2(\Delta v)$.

In other embodiments, the value of $\Delta v$ is larger than 0.45 B and not larger than 0.6 B. Applicant has noticed that, for $\Delta v$ larger than 0.45 B and not larger than 0.6 B, the cut-off frequency of the low pass transfer function is preferably selected to be not larger than about $2(\Delta v)$, more preferably not larger than $1.5(\Delta v)$.

The electrical signal path, which is, in the preferred embodiments, a passive electrical path, can be implemented in several ways, such as by means of a low-pass passive electric filter, a cascade RC equivalent circuit made of a combination of a passive electrical filter and the laser parasitics, a suitable selection of the laser parasitics or by properly designing the electrical path between the driver and the laser (without the use of a filter component). Examples and implementations may be used alone or in combination.

Figure 12:
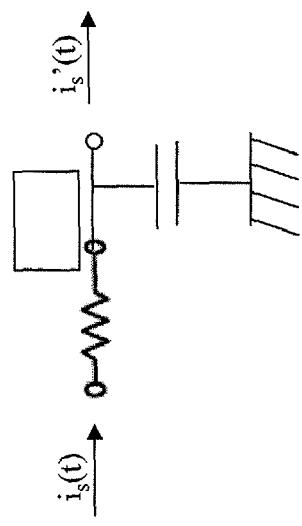
FIG. 12 illustrates the equivalent electrical circuit of a laser parasitics.

Parasitic effects of the laser normally appear when the laser is integrated/connected with other electrical or optical components and result in associated parasitic impedances with an equivalent series resistance and associated parallel capacitance and/or inductance. The equivalent electrical circuit of the laser parasitics acts as an RC electrical filter, which is, for most DML lasers for optical communications, a low-pass filter with a given cut-off frequency. The electric equivalent of the laser parasitics is illustrated in FIG. 12 as a RC low-pass filter. Selecting a value of cut-off frequency can be carried out by selecting a laser chip with a particular value of RC parasitics, e.g., by choosing a laser chip with particular values of junction capacitance and series resistance, and/or by bonding the laser chip with the electrical RF circuit from contacts to the driver board of the transmitter by means of pads and/or wires having a given impedance.

Applicant has noted that some DMLs presently available for the applications for optical transmitters, such as semiconductor DFB laser chips, exhibit variable but in general relatively high cut-off frequencies, which are above the range in accordance to an aspect of the present teachings.

Therefore, in order to achieve the desired low-pass transfer function, it is often required, but not always necessary, to properly design the electrical connections between the data generator and the laser source and/or to introduce an electrical low-pass filter in the electrical path. In general, the electrical signal path is defined as the path the electrical signal generated from the data generator (i.e., in most cases, from the laser driver output) travels up to the input of the laser source, e.g., to the input of a DFB laser diode.

According to an embodiment, a suitable electrical signal path is obtained by selecting wire bonds and/or wire strips on the electrical board so that the resulting cut-off frequency of the transfer function of the electrical signal path between the digital data generator and the laser source is not larger than about $2.2\Delta v$ and preferably not smaller than about $\Delta v$.

Figure 13:
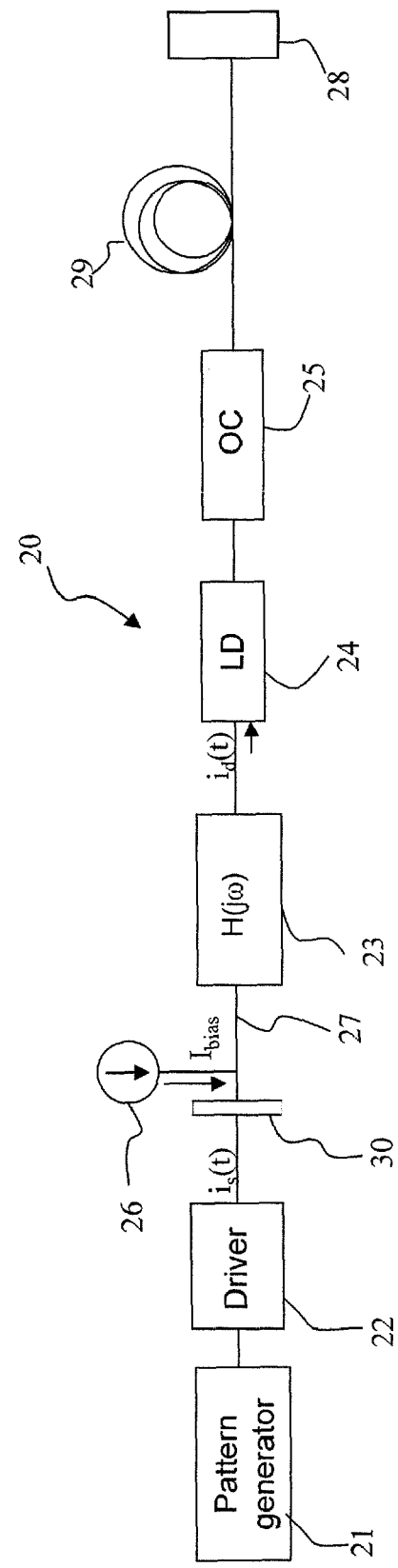
FIG. 13 is a schematic diagram of an optical communication system comprising an electrical signal path with transfer function $H(j\omega)$ between the data generator and the laser source, in accordance with a representative embodiment.

FIG. 13 shows an optical communication system according to an embodiment of the present teachings. Optical system 20 comprises a digital pattern pulse generator 21 delivering data sequences of binary-coded pulses at bit rate B that form the information data signal to a laser driver 22 that provides a current modulated with the information data signal, $i_s(t)$, to an electrical signal path 27. Although in the example shown in the figure the laser driver and the pattern pulse generator are shown as two separate electrical components, they can be integrated in a single package. Herein, the device that is apt to generate a digitally encoded electrical data signal, $i_s(t)$, typically comprising a pattern pulse generator and a laser driver, is referred to as the data (signal) generator.

The modulated current $i_s(t)$ is to be provided as input signal for direct modulation of a laser source 24, i.e., a laser diode, biased above threshold by a bias current $I_{bias}$ supplied by a bias current supply 26. Optionally, a bias-T device 30, of known type, arranged along the electrical path 27, is used to combine the modulation current $i_s(t)$ with the DC bias current $I_{bias}$.

The electrical signal path 27 between the laser driver output and the laser diode input is characterized by a low-pass transfer function with cut-off frequency equal to $f_c$ resulting in a filtering of the modulated current $i_s(t)$ output by the laser driver to form a low-pass filtered current $i_d(t)$. The low-pass filtered current $i_d(t)$ is the input to the laser diode 24, which emits a substantially FM optical signal. The optical signal from the laser then passes through an optical converter 25, which is apt to generate a substantially AM signal. The optical converter 25 is a pass-band optical filter, preferably having a periodic optical transfer function. The laser signal spectrum is aligned with a low-transmittance region of the optical converter, as described above. In an embodiment, the optical converter is a MZ optical filter and preferably a single-stage MZ optical filter. In an embodiment, the optical transfer function of the low-transmittance region is substantially parabolic.

The resulting signal from the optical converter is transmitted through an optical fiber link 29 and is then detected by receiver 28.

In FIG. 13, the filtering function of the electrical path between the laser driver output and the laser source input is represented as an equivalent discrete component 23. However, as discussed above, the desired low-pass transfer function can be achieved by the use of one or more passive low-pass filters (as discrete components) and/or by properly selecting the electrical connecting components composing the electrical path and/or by tailoring the laser source parasitics.

Therefore, the discrete component 23 is intended to represent an equivalent RC circuit characterised by a certain low-pass transfer function with a cut-off frequency equal to $f_c$ and it will be indicated also as the equivalent low-pass filter.

The transfer function of the equivalent low-pass filter, can be viewed as a rational function $H(j\omega)$ defined by the ratio of two finite-order polynomial complex functions, $Y(j\omega)$ and $X(j\omega)$, each having real coefficients, $$H(j\omega) = \frac{X(j\omega)}{Y(j\omega)} \tag{6}$$

where ω is the angular frequency. The poles and zeroes of the rational function H(jω) will either be real or occur in complex conjugate pairs. If the polynominal functions Y(jω) and X(jω) are of order N and M, respectively, then the transfer function of the equivalent passive filter has N zeroes and M poles and the order of the filter is the maximum between N and M.

Figure 14:
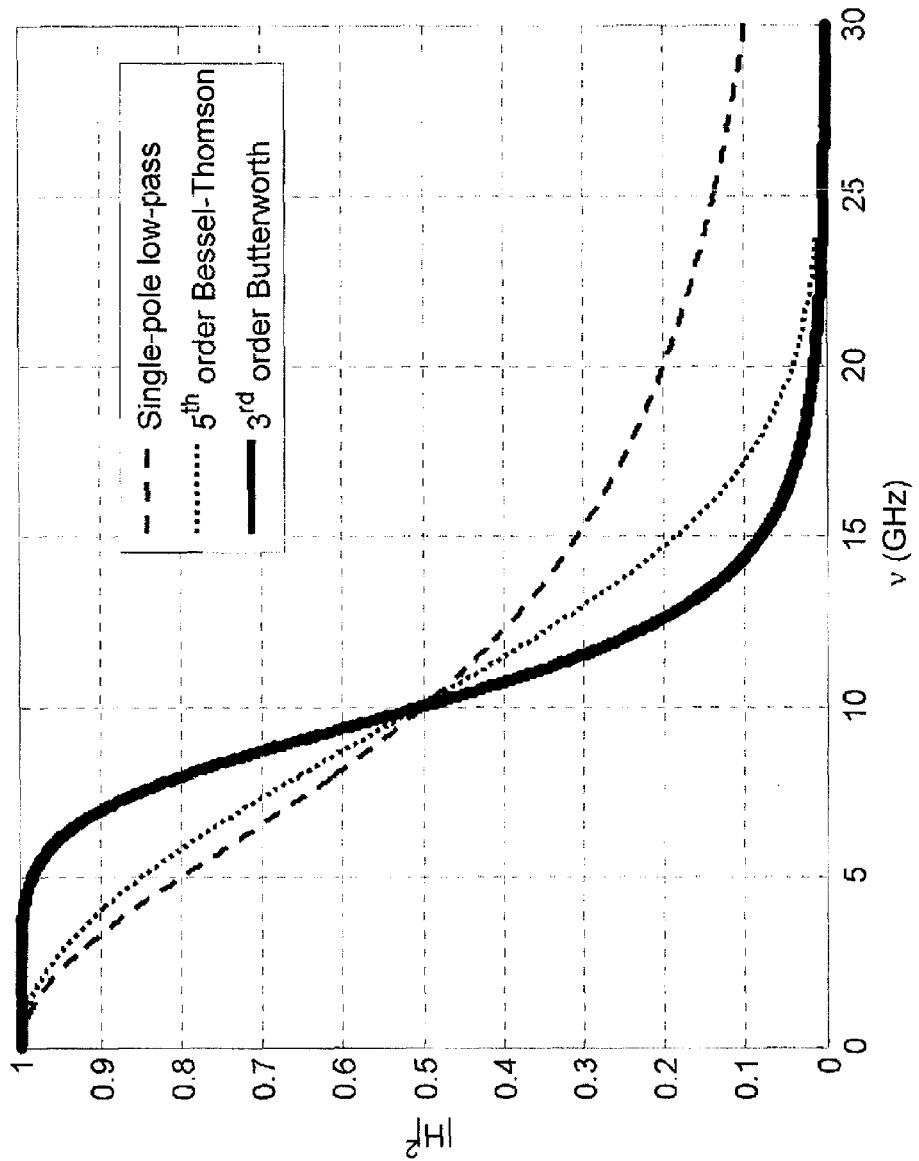
FIG. 14 illustrates a typical rational transfer function of three exemplary types of low-pass filters, namely a single-pole filter (dashed line), a $5^{th}$-order Bessel-Thomson filter (dotted line) and $3^{rd}$-order Butterworth filter (thick solid line) in accordance with a representative embodiment.

FIG. 14 illustrates the square module of the rational transfer function of three exemplary types of low-pass filters, namely a single-pole filter (dashed line), a $5^{th}$-order Bessel-Thomson filter (dotted line) and $3^{rd}$-order Butterworth filter (thick solid line). In the example shown in the figure, each of the three filters has a cut-off frequency, $f_c$, of 10 GHz.

A single-pole low-pass filter can be for example the RC laser parasitics equivalent filter and has a frequency response given by $$H(j\omega) = \frac{1}{1 + j\omega/\omega_c}, \tag{7}$$

where $\omega_c = 2\pi f_c$, $f_c$ being the cut-off frequency (at −3 dB).

In an alternative example, the component 23 can be a $3^{rd}$-order low-pass Butterworth filter with frequency response $$H(j\omega) = \frac{1}{(1 + j\omega/\omega_c)(1 + j\omega/\omega_c + (j\omega/\omega_c)^2)}, \tag{8}$$

where $\omega_c = 2\pi f_c$.

Figure 15:
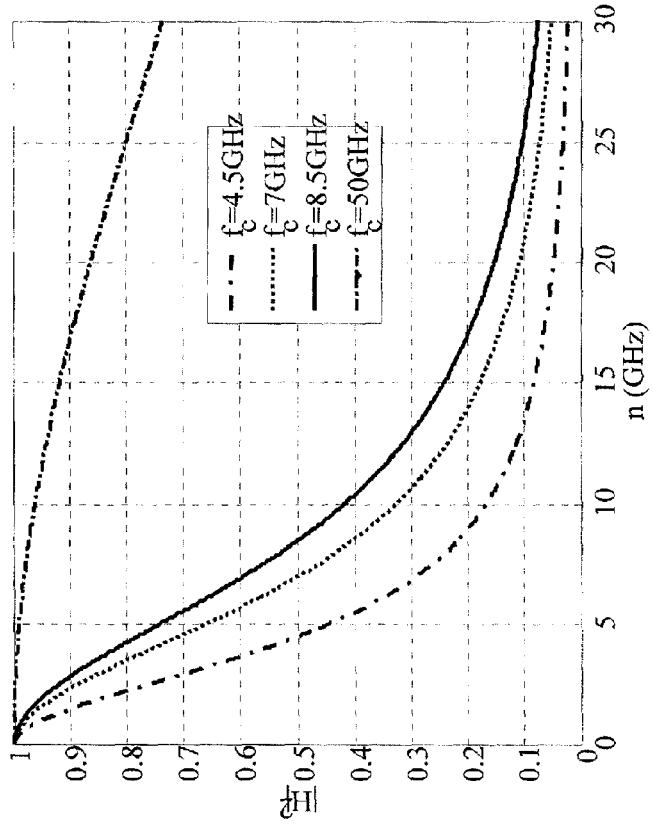
FIG. 15 illustrates the rational transfer function of a single-pole low-pass filter for different values of cut-off frequency, $f_c$.

FIG. 15 reports on the frequency response of a single-pole low-pass filter for different cut-off frequencies, namely 4.5 GHz (long dash-dotted line), 7 GHz (dotted line), 8.5 GHz (solid line) and 50 GHz (short dash-dotted line).

It is to be understood that a multiple-pole low-pass filter characterized by a (fundamental) cut-off frequency $f_c$ can be used. The electrical filter may have a low-pass transfer function comprising an equalizing function exhibiting either zeros, poles or both.

Figure 16:
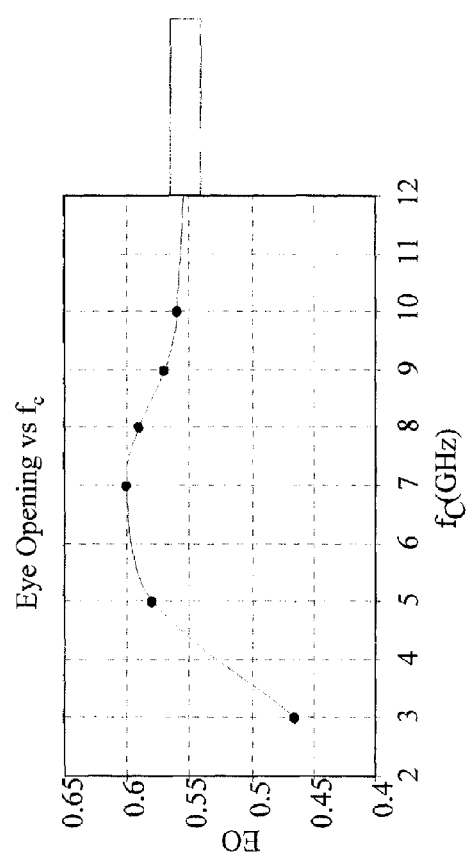
FIG. 16 reports on results of computer simulations of eye opening values in an optical system as a function of cut-off frequency (B=11.1 Gb/s, L=80 Km of SMF, $\Delta v$=5.7 GHz) in accordance with a representative embodiment.

With reference to an optical system as that schematically shown in FIG. 13, computer simulations were carried out and the transmission performance evaluated in terms of optical Eye Opening (EO) at the end of an optical link 80 km long made of SMF fiber versus the cut-off frequency of the low-pass electrical path. Results of simulations are shown in FIG. 16. In the simulations, the laser driver 22 generates a current $i_s(t)$ modulated with a peak-to-peak modulation current of 30 mA in response to a PRBS $2^7-1$ bit stream at 11.1 Gb/s. The laser source is a DFB semiconductor laser biased with a current $I_{bias} = 80$ mA. The frequency excursion in response to the peak-to-peak modulation current is Δν=5.7 GHz. The optical converter is a MZ filter with FSR of 25 GHz. Spectral detuning of the MZ filter with respect to the laser signal spectrum is optimized for every value of cut-off frequency, $f_c$, so as to maximize the eye opening of the propagated optical signal.

It can be observed that the EO of the optical system takes up high values for $f_c$ comprised between 5 and 9 GHz, the maximum values being in the range between 6 and 8 GHz. For values of $f_c$ larger than 9 GHz the compensating effect of the filter begins to disappear because the cut-off frequency of the electrical filter is close to or exceeds that of the laser itself, which is in the example of about 12 GHz. In FIG. 16, the EO curve above 10 GHz is expected to become substantially flat.

In one embodiment, Δν is selected to be about B/2 and the value of $f_c$ is selected to be not larger than 2Δν, preferably to be not larger than about 1.5Δν.

Figure 17:
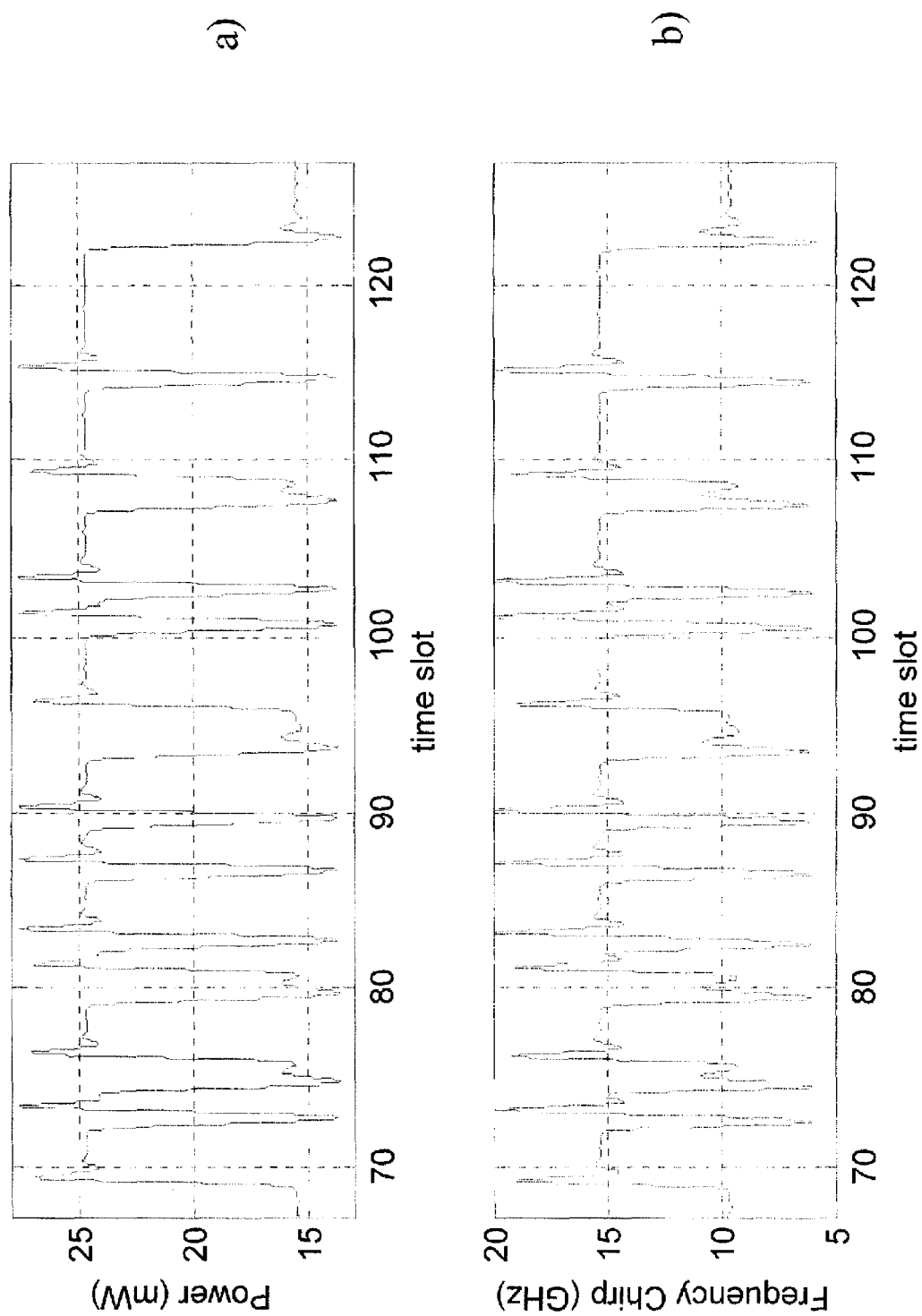
FIGS. 17(a) and (b) show results of computer simulations of temporal profiles of the laser power and instantaneous frequency chirp, respectively, when no low-pass electrical filtering (within the meaning of an aspect of the present teachings) is applied to the modulation current.

The FIGS. 17(a) and 17(b) show simulated temporal profile of the power and instantaneous frequency chirp, respectively, at the DFB laser output for the system parameters described with reference to FIG. 16 and no electrical filtering (within the meaning of an aspect of the teachings) is applied to the modulation current $i_s(t)$. The ER between the '1' and '0' levels of FIG. 17(a) is equal to about 1.8 dB. The overshoots above $\nu_1$ and undershoots below $\nu_0$ in the '0' to '1' and in the '1' to '0' transitions are the transient chirp. It can be observed that spectra exhibit significant transient chirp contribution.

Figure 18:
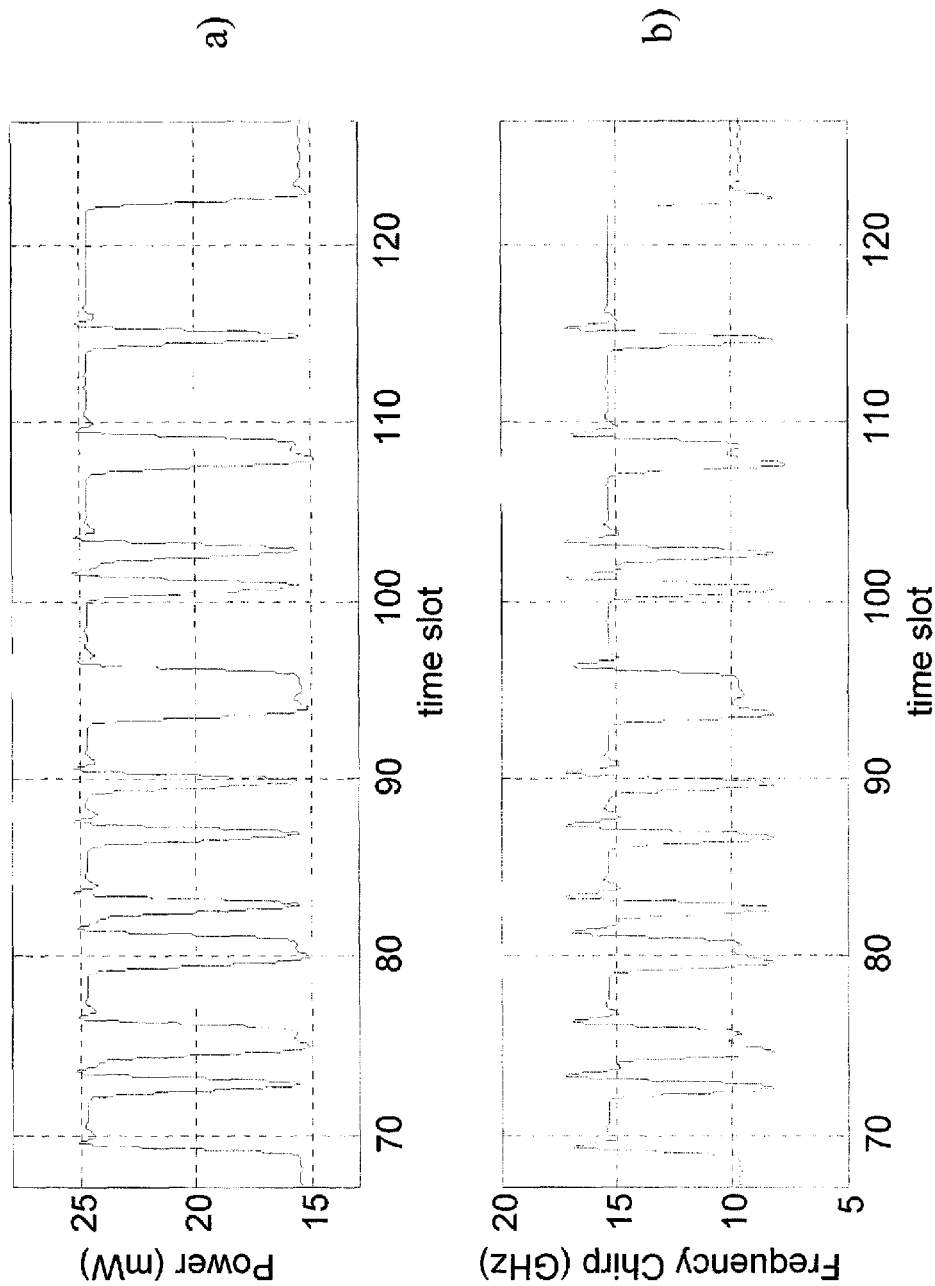
FIGS. 18(a) and (b) show results of computer simulations of temporal profiles of the laser power and instantaneous frequency chirp, respectively, when low-pass electrical filtering with cut-off frequency of 7 GHz is applied to the modulation current, in accordance with a representative embodiment.

FIGS. 18(a) and (b) show the simulated temporal profile of the power and instantaneous frequency chirp, respectively, at the DFB laser output for the system parameters described with reference to FIG. 16 and for an electrical signal path with cut-off frequency of 7 GHz (i.e., of about 1.2Δν). The ER between the '1' and '0' levels of FIG. 18(a) is again equal to about 1.8 dB. It can be seen that the overshoots above $\nu_1$ and undershoots below $\nu_0$ in the '0' to '1' and in the '1' to '0' transitions are smoothed by the low-pass electrical filtering of the injection current $i_s(t)$. Appropriate selection of the cut-off frequency significantly compensates for the abrupt transients of the DML.

Figure 19:
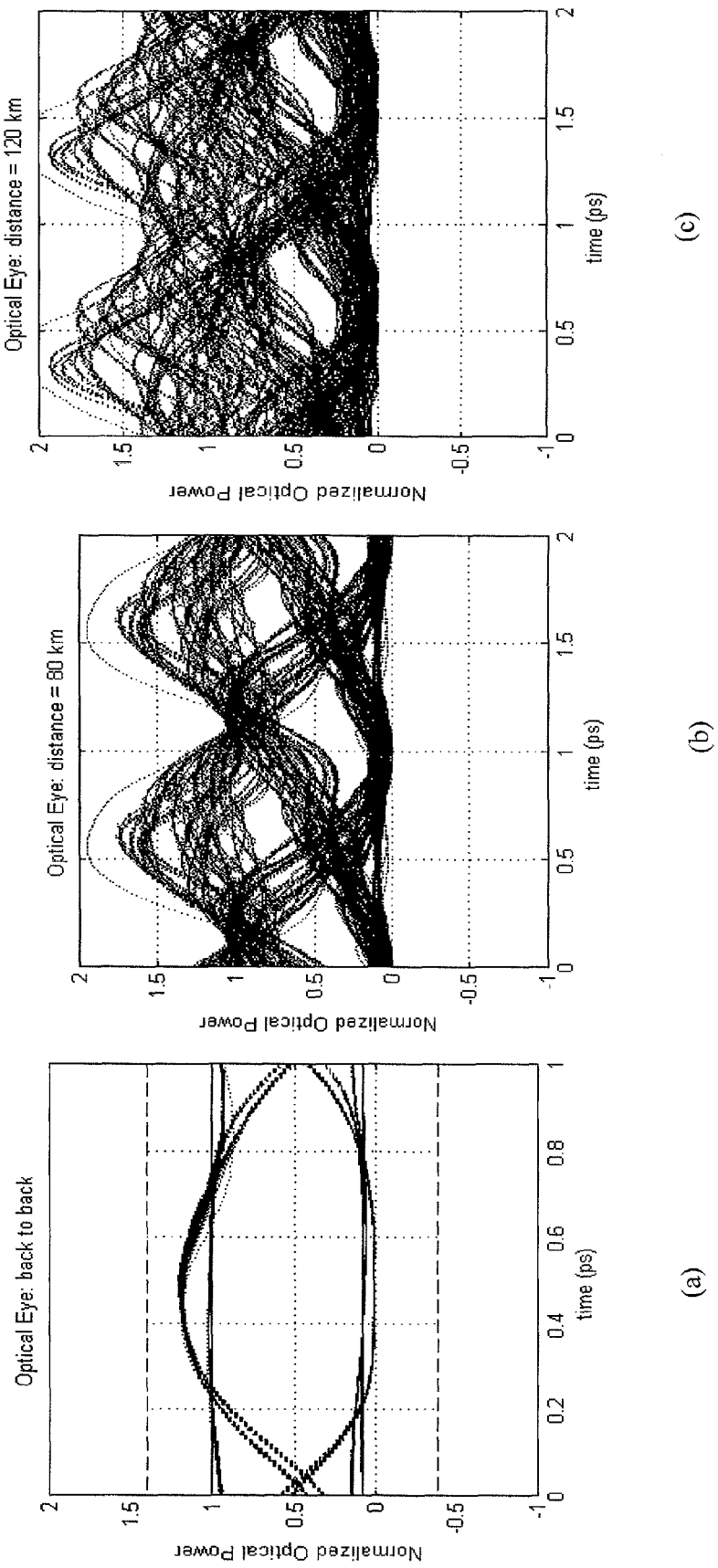
FIGS. 19(a), (b) and (c) show computer simulations of the digital data stream in the form of an optical eye opening diagram at the output of the transmitter (a), i.e., downstream the optical converter; after 80 km of propagation of the signal along a standard SMF (b), and after 120 km of signal propagation (c) when no low-pass electrical filtering is applied to the modulation current $i_s(t)$.

FIGS. 19(a), (b) and (c) show optical eye opening diagrams at propagation distances of 0 (i.e. back-to-back condition), 80 and 120 Km of SMF for the system parameters described with reference to FIG. 16 when no electrical filtering is applied to the injection current $i_s(t)$. The transients arising from the direct modulation of the laser appear as overshoots on the optical power in the '0' to '1' transitions, see FIG. 19(a). The propagated optical eye exhibits severe distortion increasing with propagation distance. The optical EO is 0.48 and 0.27 at 80 Km and 120 Km, respectively, as shown in FIGS. 19(b) and (c).

Figure 20:
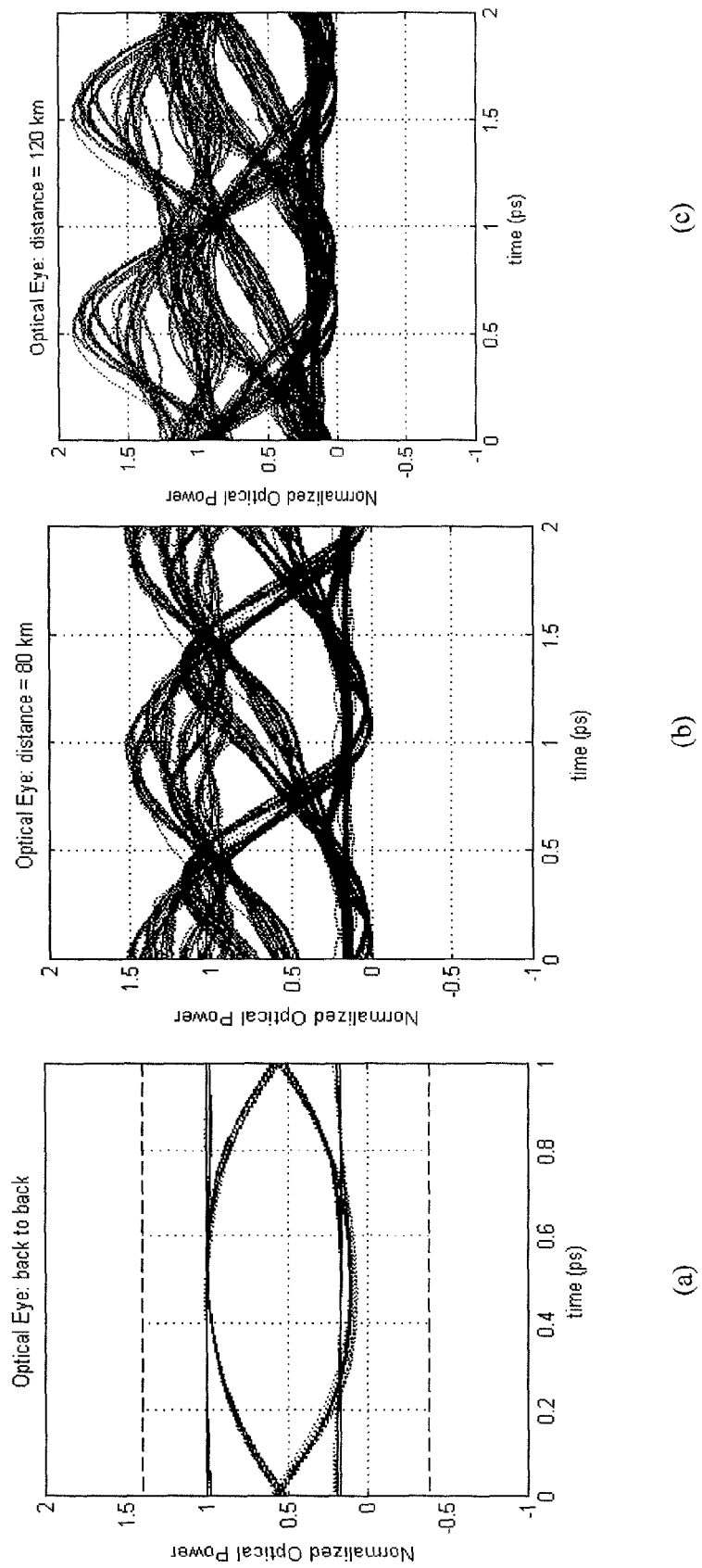
FIGS. 20(a), (b) and (c) show computer simulations of the digital data stream in the form of an optical eye opening diagram at the output of the transmitter (a), i.e., downstream the optical converter; after 80 km of propagation of the signal along a standard SMF (b), and after 120 km of signal propagation (c) when low-pass electrical filtering with cut-off frequency of 7 GHz is applied to the modulation current $i_s(t)$.

When an electrical filtering with a cut-off frequency of 7 GHz is applied to the injection current $i_s(t)$, a dramatic reduction of the overshoots due to the transients arising from the direct modulation of the laser is observed in the back-to-back condition and shown in FIG. 20(a). The beneficial effect of electrical filtering is even more effective upon propagation. In fact, the EO of the propagated optical signal exhibits a dramatic increase with respect to the case with no electrical filtering. The optical EO is 0.6 and 0.41 at 80 Km and 120 Km, respectively.

As it has been described above in connection with representative embodiments, an optical communication system with a transmitter including a directly modulated laser and an optical converter, having the laser output spectrum substantially aligned with the low transmission region of the optical converter spectrum, significantly improves the reach and/or performance of signal transmission by low-pass filtering the electrical data signal driving the laser to substantially remove the signal components with frequencies greater than about 2.2 times the value of the frequency excursion resulting from the modulation. In this way, the impairment due to the transient chirp reduces the dispersion penalty at large propagation distances, i.e. larger than about 70 km for a SMF optical fiber link. In view of this disclosure it is noted that the optical communication system described herein can be implemented in a variety of devices, variant structures, configurations and topologies. Moreover, applications other than communications may benefit from the present teachings. Further, the various devices, structures and parameters are included by way of example only and not in any limiting sense. In view of this disclosure, those skilled in the art can implement the present teachings in determining their own applications and needed devices and equipment to implement these applications, while remaining within the scope of the appended claims.

We claim:

1. An optical communication system for transmitting digital optical signals comprising:
   an optical source adapted to receive a digitally encoded data signal comprising sequences of data at a data rate (B) and comprising two signal levels representing a first state and a second state of the data signal, the optical source being adapted to produce an optical signal substantially frequency modulated with frequency excursion $\Delta\nu$ comprising a first instantaneous frequency ($\nu_0$) associated to the first state and a second instantaneous frequency ($\nu_1$) associated to the second state;
   an optical converter adapted to receive the substantially frequency modulated optical signal, the optical converter having an optical transfer function varying with frequency and including at least one pass band, the at least one pass band having a peak transmittance and at least a low-transmittance region, wherein
   the first instantaneous frequency ($\nu_0$) of the frequency modulated optical signal is spectrally aligned within the low-transmittance region of the optical transfer function of the optical converter thereby converting the substantially frequency modulated signal into a substantially amplitude modulated signal and
   the at least one pass band has a FWHM comprised between 70% and 200% of the data rate (B) of the frequency modulated optical signal.

2. The system of claim 1, wherein the FWHM of the at least one pass band of the optical converter is comprised between 100% and 150% of the data rate.

3. The system of claims 1, wherein the low-transmittance region comprises a transmittance notch and the first instantaneous frequency ($\nu_0$) of the frequency modulated optical signal is spectrally aligned substantially in correspondence with the transmittance notch.

4. The system claim 1, wherein the transmittance in the low-transmittance region is at least 10 dB less than the peak transmittance of the at least one pass band of the optical transfer function.

5. The system of claim 1, wherein the optical source comprises one of: a directly modulated laser source; a distributed feedback laser; an external cavity laser.

6. The system of claim 1, wherein the optical converter includes a Mach-Zehnder filter.

7. The system of claim 1, wherein the optical transfer function has a periodic frequency response defined by a free spectral range (FSR).

8. The system of claim 1, wherein the frequency excursion $\Delta\nu$ has a magnitude comprised between 0.3 and 0.6 times the data rate (B).

9. The system of claim 1, wherein the low-transmittance region has a substantially parabolic optical transfer function.

10. The system of claim 1, wherein said digital encoded data signal is in a NRZ modulation format.

11. An optical communication system for transmitting digital optical signals comprising:
    a data generator adapted to generate a digitally encoded data signal comprising sequences of data at a data rate (B) and comprising two signal levels representing a first state and a second state of the data signal;
    an optical source adapted to receive the data signal and to produce an optical signal substantially frequency modulated with frequency excursion $\Delta\nu$ comprising a first instantaneous frequency ($\nu_0$) associated to the first state and a second instantaneous frequency ($\nu_1$) associated to the second state;
    an electrical signal path adapted to receive the data signal generated by the data generator and to input the data signal into the optical source, the electrical signal path having a low-pass transfer function with a cut-off frequency $f_c$;
    an optical converter adapted to receive the substantially frequency modulated optical signal, the optical converter having an optical transfer function varying with frequency and including at least one pass band, the at least one pass band having a peak transmittance and at least a low-transmittance region, wherein
    the first instantaneous frequency ($\nu_0$) of the frequency modulated optical signal is spectrally aligned within the low-transmittance region of the optical transfer function of the optical converter thereby converting the substantially frequency modulated signal into a substantially amplitude modulated signal and
    the cut-off frequency $f_c$ of the electrical signal path is not larger than about 2.2 times the frequency excursion $\Delta\nu$.

12. The system of claim 11, wherein the frequency excursion $\Delta\nu$ is selected to be larger than 0.45 and not larger than 0.6 times the data rate (B).

13. The system of claim 11, wherein the frequency excursion $\Delta\nu$ is selected to be comprised between 0.3 and 0.45 times the data rate (B).

14. The system of claim 11, wherein the cut-off frequency $f_c$ of the electrical signal path is not larger than about twice the frequency excursion $\Delta\nu$.

15. The system of claim 11, wherein the cut-off frequency $f_c$ of the electrical signal path is not smaller than the 0.8 times the frequency excursion $\Delta\nu$.

16. The system of claim 11, wherein the low-transmittance region comprises a transmittance notch and the first instantaneous frequency ($\nu_0$) of the frequency modulated optical signal is spectrally aligned substantially in correspondence with the transmittance notch.

17. The system of claim 11, wherein the transmittance in the low-transmittance region is at least 10 dB less than the peak transmittance of the at least one pass band of the optical transfer function.

18. The system of claim 11, wherein the at least one pass band has a FWHM comprised between 70% and 200% of the data rate (B) of the frequency modulated optical signal.

19. The system of claim 11, wherein the optical converter includes a Mach-Zehnder filter.

20. A method of transmitting digital optical signals comprising the steps of:
    generating a digitally encoded data signal comprising sequences of data at a data rate and comprising two signal levels representing a first state and a second state of the data signal;
    electrically filtering with a low-pass transfer function having a cut-off frequency $f_c$ the data signal so as to produce a low-passed filtered data signal;
    providing the low-passed filtered data signal to an optical source for generating a digital optical signal substantially frequency modulated with frequency excursion $\Delta\nu$ comprising a first instantaneous frequency ($\nu_0$) associated to the first state and a second instantaneous frequency ($v_1$) associated to the second state, and passing the frequency modulated optical signal through an optical converter having an optical transfer function varying with frequency and including at least one pass band, the at least one pass band having a peak transmittance and at least a low-transmittance region, wherein the step of passing the digital optical signal through the optical converter comprises the step of spectrally aligning the first frequency of the frequency modulated optical signal within the low-transmittance region of the optical transfer function of the optical converter thereby converting the substantially frequency modulated signal into a substantially amplitude modulated signal and wherein the cut-off frequency $f_c$ of the electrical signal path is not larger than about 2.2 times the frequency excursion $\Delta v$.

* * * * *